(12) United States Patent
De Villiers et al.

(10) Patent No.: US 7,791,354 B2
(45) Date of Patent: Sep. 7, 2010

(54) IMPEDANCE MONITORING SYSTEM AND METHOD

(75) Inventors: Wernich De Villiers, Stellenbosch (ZA); Johannes Hendrik Cloete, Stellenbosch (ZA)

(73) Assignee: University of Stellenbosch, Stellenbosch (ZA)

( * ) Notice: Subject to any disclaimer, the term of this patent is extended or adjusted under 35 U.S.C. 154(b) by 404 days.

(21) Appl. No.: 11/666,429

(22) PCT Filed: Oct. 28, 2005

(86) PCT No.: PCT/IB2005/053529

§ 371 (c)(1),
(2), (4) Date: Aug. 13, 2007

(87) PCT Pub. No.: WO2006/046215

PCT Pub. Date: May 4, 2006

(65) Prior Publication Data

US 2008/0048676 A1 Feb. 28, 2008

(30) Foreign Application Priority Data

Oct. 28, 2004 (ZA) .................................. 2004/8736

(51) Int. Cl.
*G01R 27/00* (2006.01)
*H01P 3/08* (2006.01)

(52) U.S. Cl. .................. 324/629; 324/600; 333/127
(58) Field of Classification Search ................. 324/600, 324/629; 333/127
See application file for complete search history.

(56) References Cited

U.S. PATENT DOCUMENTS

| 4,506,209 A | * | 3/1985 | Landt | 324/637 |
| 4,704,573 A | * | 11/1987 | Turner, Jr. | 324/646 |
| 5,563,558 A | * | 10/1996 | Mohwinkel et al. | 333/127 |
| 6,599,759 B2 | * | 7/2003 | Yang et al. | 438/5 |

FOREIGN PATENT DOCUMENTS

ZA 20024105 * 8/2003

OTHER PUBLICATIONS

Yanagisawa, "Level Measuring Method For Distribution Line Carrier Signal", Patent Abstracts of Japan of JP 06 318888, published Nov. 15, 1994.
Cloete, et al., "conductor physical condition monitoring method for power transmission system, involves determining conductor temperature and elongation utilizing monitored signal level fluctuation of monitoring signal", Abstract of South African 2002-04105, (Aug. 27, 2003).

* cited by examiner

*Primary Examiner*—Timothy J Dole
*Assistant Examiner*—Farhana Hoque
(74) *Attorney, Agent, or Firm*—Finnegan, Henderson, Farabow, Garrett & Dunner, L.L.P.

(57) ABSTRACT

A system (10) for monitoring PLC impedance of a phase conductor 12.1 of a high voltage overhead power transmission line (OHTL) 12 comprises a hybrid 40 comprising a first port (40), a second port (40.2) and a third port (40.3). The hybrid is configured to divide power received at the first port between the second and third ports, at least partially to isolate the second port from power received at the third port and at least partially to isolate the third port from power received at the second port. The isolation is a function of an impedance connected to the first port 40.1. The first port is connected to the phase conductor. The second port is connected to be driven by an alternating signal source (14). The second and third ports are connected to a monitoring logging device (42) for monitoring signals at the second and third ports, thereby to monitor the isolation at second and third ports and hence impedance at the first port.

11 Claims, 8 Drawing Sheets

FIGURE 8 ically to a system and method for monitoring in real time power line carrier (PLC) impedance on a live or passive high voltage (HV) over head transmission line (OHTL).

IMPEDANCE MONITORING SYSTEM AND METHOD

TECHNICAL FIELD

This invention relates to an impedance monitoring system and method for applications in utility supply, telecommunications, remote sensing, radar, electronics etc; and more particularly to a system and method for monitoring in real time power line carrier (PLC) impedance on a live or passive high voltage (HV) over head transmission line (OHTL).

A PLC system operates to transmit and receive signals in a wide frequency band which may typically be 50 kHz to 500 kHz over an HV OHTL, while the line is carrying the normal 50 Hz mains power. Through the use of known coupling equipment or apparatus at a sub-station, the PLC signal is injected and retrieved from the OHTL. A PLC system is mainly used to communicate protection control signals (such as a tripping tone etc) for the apparatus as well as data and speech signals. The PLC system comprises a PLC transceiver; a phase combiner or hybrid, if coupling to more than one phase of the line is required; line matching units; coupling capacitors or capacitor voltage transformers; the OHTL and line traps in the line. The line trap is a known filtering device and is located in a phase of the OHTL between the coupling capacitors or capacitator voltage transformer and the sub-station to provide a high impedance in the PLC frequency band and thereby to prevent the coupled signal from being shorted out by the sub-station apparatus. Therefore, most of the PLC energy is channeled to propagate on the OHTL phases to a second remote sub-station connected to the line.

With current state of the art technology, a defect or fault on a line trap or any other PLC component cannot easily be detected under normal PLC operation. Accordingly, maintenance routines on the PLC system are performed on a regular basis, typically once every three years. Most of these routines require that the OHTL section must be taken out of service for the maintenance procedure. It will be appreciated that this procedure is time consuming and expensive.

In the applicant's ZA2002/4105, there is disclosed a PLC based system and method of monitoring sag of an OHTL. However, it has been found that unexpected changes in impedance associated with the PLC system or the sub-station or the power station affect the reliability of these measurements and monitoring. Hence, it is believed that a system and method of monitoring and/or measuring in real time the impedance associated with the line may facilitate the sag monitoring. Furthermore, a method of monitoring the impedance may also be used to monitor the condition of the line as aforesaid and to optimize operation and utilization of the line. Still furthermore, a method and system of monitoring the impedance associated with the line could facilitate matching of peripheral equipment to the line.

OBJECT OF THE INVENTION

Accordingly, it is an object of the present invention to provide a system and method of monitoring, including measuring, impedance with which the applicant believes the aforementioned disadvantages and problems may at least be alleviated.

SUMMARY OF THE INVENTION

According to the invention there is provided a system for monitoring impedance, the system comprising:
a monitoring power coupling device comprising at least a first port, a second port and a third port;
the monitoring power coupling device being configured to divide signals received at the first port between the second and third ports, the device further being configured at least partially to isolate the second port from power received at the third port and at least partially to isolate the third port from power received at the second port, the isolation being a function of an impedance connected to the first port;
the first port being connected to the impedance to be monitored;
at least one of the second port and the third port being connected to be driven by an alternating signal source; and
the second and third ports being connected to a monitoring device for monitoring signals at the second and third ports, thereby to monitor the isolation at the second and third ports and hence impedance at the first port.

In this specification the term "monitoring" is used to include within its scope "measuring", whereby a complex value of the impedance is determined. The term "impedance" is used to denote the ratio of a voltage phasor and a current phaser at frequencies of interest. The term "alternating signal" is used to include within its scope a fixed frequency continuous wave (CW) signal, a stepped frequency continuous wave (SFCW) signal and any other alternating signal having a suitable waveform.

The impedance may be that of any electrical system, apparatus, device, component, conductor or line, including a phase conductor of an overhead power transmission line. The impedance of a phase conductor may be attributable to the OHTL geometry, including average sag, and/or a sub-station at one or both ends of the OHTL and/or a phase conductor line trap and/or other PLC component and/or other HV system components. The phase conductor may be connectable to the first port by a suitable signal transmission line, such as a coaxial cable and coupling equipment. The coupling equipment may comprise a line matching unit and one of a coupling capacitor and capacitor voltage transformer.

The monitoring power coupling device may comprise a power splitter and combiner. The power splitter and combiner may comprise a hybrid comprising a transformer providing the first, second and third ports.

The impedance being monitored may be the impedance presented by the line to a power line carrier (PLC) signal and which PLC signal is injected on the line by a PLC system.

The first port may be terminated by the impedance to be monitored and the second and third ports are preferably terminated by or connected to respective impedances, each of which is substantially equal to a characteristic impedance of the PLC system.

In one embodiment, the first port of the monitoring power coupling device is connected to a first phase conductor of the OHTL; the PLC system may comprise a PLC power coupling device having a first port, a second port and a third port, and a PLC transceiver connected to the first port of the PLC power coupling device, the second port of the PLC power coupling device being connected to a second phase conductor of the OHTL and the third port of the PLC power coupling device being connected to the second port of the monitoring power coupling device to cause the PLC transceiver to drive the second port of the monitoring power coupling device.

In another embodiment, the first port of the monitoring power coupling device is connected to a first phase conductor of the OHTL and the third port of the monitoring power coupling device is connected to a signal generator to drive the third port.

Also included within the scope of the present invention is a method of monitoring impedance, the method comprising the steps of:

using a monitoring power coupling device comprising at least a first port, a second port and a third port, the monitoring power coupling device being configured to divide power received at the first port between the second port and the third port, the device further being configured at least partially to isolate the second port from power received at the third port and at least partially to isolate the third port from power received at the second port, the isolation being a function of an impedance at the first port;

connecting the impedance to be monitored to the first port;

driving at least one of the second port and the third port with an alternating signal; and monitoring signals at the second and third ports thereby to monitor the isolation at the second and third ports and hence impedance at the first port.

Variations in the isolation may be monitored by monitoring a ratio of voltages at the third and second ports. The ratio is preferably a complex ratio.

Yet further included within the scope of the present invention is an impedance monitoring arrangement comprising a monitoring power coupling device comprising at least a first port, a second port and a third port, the monitoring power coupling device being configured to divide power received at the first port between the second and third ports, the device further being configured at least partially to isolate the second port from power received at the third port and at least partially to isolate the third port from power received at the second port, the isolation being a function of an impedance at the first port; the first port being connectable to an impedance to be monitored; at least one of the second and third ports being connectable to be driven by an alternating signal source; and a monitoring logging device connectable to the second and third ports to monitor signals at the second and third ports.

The impedance monitoring arrangement may be portable and the first port may be connectable to any phase conductor of an HV OHTL, to measure impedance in a PLC frequency band presented by the phase conductor.

The arrangement may be configured to be used as a line trap or other PLC component tester, to test a line trap in the phase conductor or any other defective components of the PLC system.

BRIEF DESCRIPTION OF THE ACCOMPANYING DIAGRAMS

The invention will now further be described, by way of example only, with reference to the accompanying diagrams wherein.

DESCRIPTION OF A PREFERRED EMBODIMENT OF THE INVENTION

Figure 1:
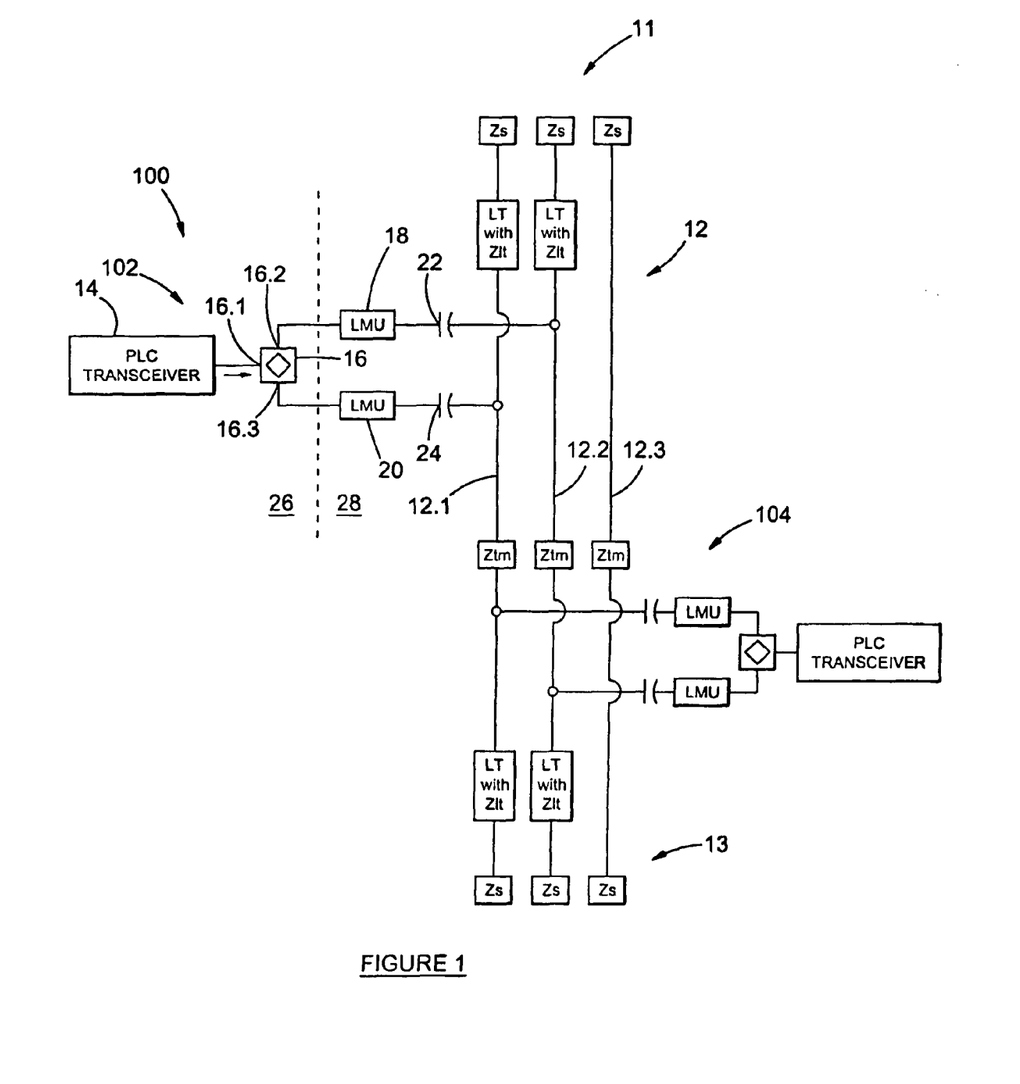
FIG. 1 is a block diagram of a known PLC system connected to a multi-phase overhead transmission line (OHTL)

A block diagram of a known PLC system 100 connected to a three phase high voltage (HV), typically 400 kV, overhead transmission line (OHTL) 12 is shown in FIG. 1.

The OHTL 12 comprises a centre phase conductor 12.2 and two outer phase conductors 12.1 and 12.3 respectively. The OHTL extends between spaced dead end structures such as a first sub-station 11 and a second sub-station 13. Between the dead end structures, the OHTL is supported in known manner by spaced suspension towers (not shown).

The PLC system 100 comprises first and second similar parts 102 and 104 located at the first and second sub-stations 11 and 13, respectively. Since the parts are similar in configuration, only the first part 102 will be described. The first part comprises a known PLC transceiver 14 connected to a first port 16.1 of a known PLC power coupling device or power splitter/combiner 16. Second and third ports 16.2 and 16.3 of the splitter/combiner are connected in known manner via line matching units (LMU) 18 and 20 and coupling capacitors 22 and 24 to inner and outer phase conductors 12.2 and 12.1 respectively of the OHTL 12. The transceiver 14 and splitter/combiner 16 are typically located in a control room 26 at the first sub-station 11 and the line matching units, coupling capacitors and line traps (LT) are located in a HV yard 28 at the first sub-station 11. The LMU 18 comprises a known passive matching transformer, which matches the impedance of the OHTL (which is typically about 350 ohm in the PLC frequency band) to the design characteristic impedance $Z_0$ of the PLC system, which will be taken to be 75 ohms throughout, but may differ depending on the specific PLC system. In the reverse direction, the splitter acts as a phase combiner.

Figure 3:
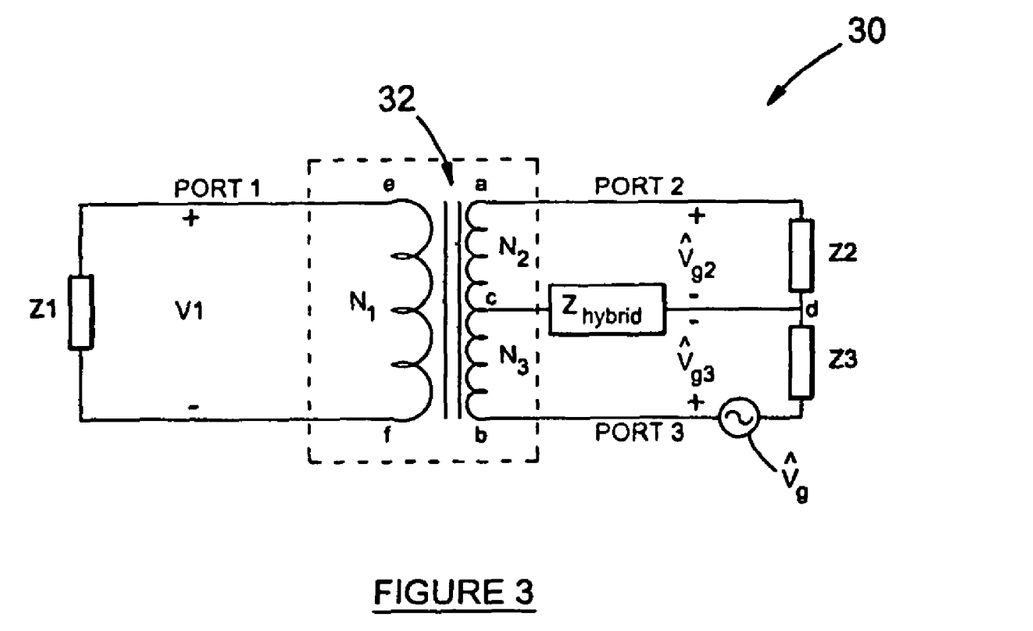
FIG. 3 is a simplified circuit diagram of a power coupling device in the form of a power splitter/combiner or hybrid forming part of the monitoring system.

The splitter/combiner 16 is preferably in the form of a hybrid 30 (shown in FIG. 3) comprising a known low insertion loss three-port transformer 32, which is wound in such a way that signals received at a first port of the hybrid are essentially equal to the sum of signals delivered at second and third ports of the hybrid. Differential mode signals received at the second and third ports are summed at the first port, while common mode signals received at the second and third ports are delivered to an internal isolation impedance Z_hybrid, but not to the first port. Therefore, signals transmitted by a PLC transceiver 14 are divided to drive the two phase conductors 12.1 and 12.2 of the OHTL as hereinbefore described, usually in anti-phase and differential mode signals received from the OHTL are combined at the hybrid 16 and delivered to the PLC transceiver. In the normal configuration of the hybrid hereinbefore described, $Z_1$ in FIG. 3 represents the impedance of the PLC transceiver 14, which is designed to be as close as possible to the characteristic impedance $Z_0$ of 75 ohm at the operating frequency and $Z_2$ and $Z_3$ are impedances of the PLC system on the OHTL, also about 75 ohm each.

Figure 2:
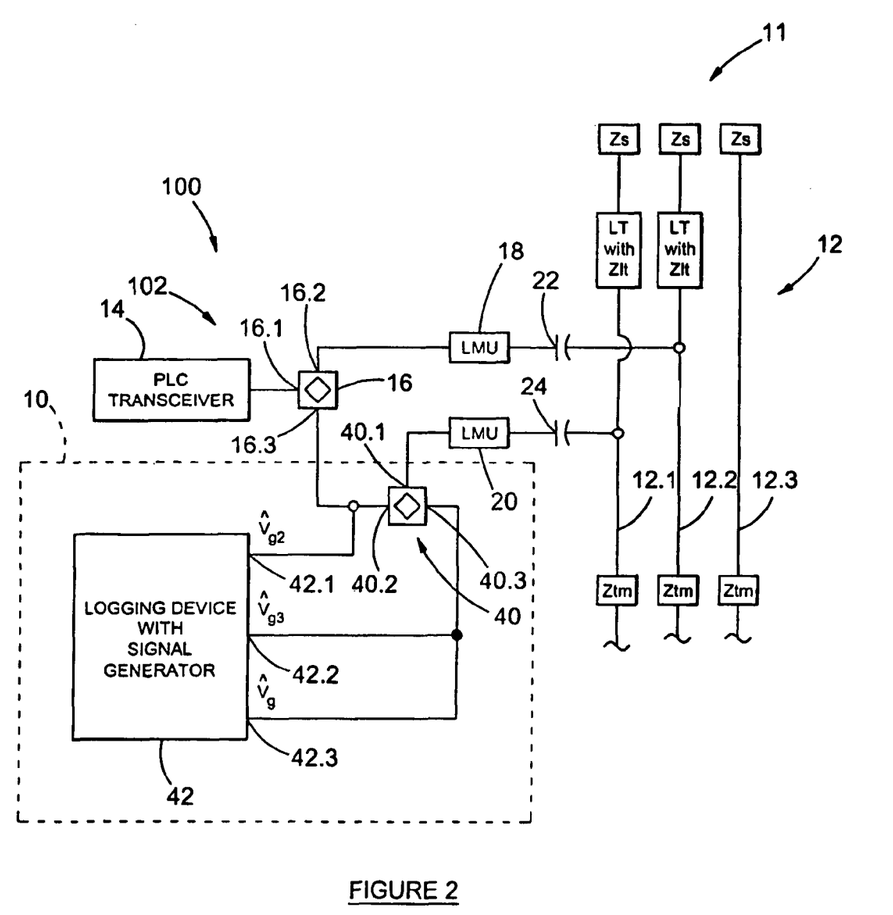
FIG. 2 is a block diagram of a PLC impedance monitoring system connected to an outer phase conductor of the OHTL.

Referring to FIG. 2, the impedance monitoring system 10 according to the invention comprises a second and similar hybrid 40 having a first port 40.1, a second port 40.2 and a third port 40.3. The first port 40.1 is connected via a signal transmission line in the form of a co-axial cable and LMU 20 to the aforementioned outer phase 12.1 of the OHTL. The second port 40.2 is connected to both the third port 16.3 of the first hybrid 16 and a first input port 42.1 of an impedance monitoring logging device 42 with associated signal generator. The third port 40.3 of the second hybrid is terminated in a third port 42.3 of the logging device 42, which port 42.3 is associated with the signal generator and is designed to have a 75 ohm output impedance. This port 42.3 is also connected to a second port 42.2 of the impedance monitoring logging device 42. The input ports 42.1 and 42.2 of the monitoring logging device 42 have high input impedances.

As is clear from FIG. 2, hybrid 16 is used in the conventional configuration, but hybrid 40 not. However, referring to FIG. 3, each of the hybrids 16 and 40 has a winding ratio between the first port ($N_1$) to the second port ($N_2$) of square root (2). The winding ratio between the first port ($N_1$) and the third port ($N_3$) is also square root (2). Z_hybrid 36 is an impedance, which is chosen at $$\frac{Z_0}{2},$$

to achieve good isolation between the second and third ports of the hybrid. A suitable hybrid that may be used is the type A9BM manufactured by ABB Powertech.

Referring to FIGS. 2 and 3, with the first port 40.1 terminated in $Z_1$, the second port 40.2 terminated in $Z_2$ and the third port 40.3 driven with a signal generator with impedance $Z_3$ and generating voltage $\hat{V}_g$, the voltage relationship between voltage phasors $\hat{V}_{g3}$ and $\hat{V}_{g2}$ is known as the isolation between the third and second ports, and is normally expressed in dB's $$\text{Isolation} = 20\log\left|\frac{\hat{V}_{g3}}{\hat{V}_{g2}}\right| \qquad (1)$$

wherein $\hat{V}_g = V_g e^{j\omega_g t}$ $\hat{V}_{g2} = V_{g2} e^{j\phi_{g2}} e^{j\omega_g t}$ $\hat{V}_{g3} = V_{g3} e^{j\phi_{g3}} e^{j\omega_g t}$ When the second port 40.2 is driven and the third port 40.3 is terminated as aforesaid, the reciprocal of equation (1) defines the isolation. In this specification only the first case is explicitly dealt with, to give a specific example.

When both $Z_2$ and $Z_3$ are equal to the characteristic impedance $Z_0$, the voltage relationship at the second and third ports can be shown to be:

$$\frac{\hat{V}_{g3}}{\hat{V}_{g2}} = \frac{V_{bd}}{V_{ad}} = \frac{Z_0 + 3Z_1}{Z_0 - Z_1} \qquad (2)$$

It is evident that the isolation between the second port and third port is a factor of the impedance $Z_1$ at the first port 40.1 and the characteristics of the hybrid.

The complex isolation ratio is defined as $\hat{V}_3/\hat{V}_2$, which is commonly expressed as $$\text{Complex\_isolation\_ratio} = \frac{\hat{V}_{g3}}{\hat{V}_{g2}} = \frac{V_{g3}}{V_{g2}} e^{j(\phi_{g3} - \phi_{g2})} \qquad (3)$$

The magnitude of the complex isolation can be expressed in dB's as $$\text{Isolation} = 20\log\left(\frac{V_{g3}}{V_{g2}}\right) \qquad (4)$$

which is identical to equation (1).

Hence and referring again to FIG. 2, by inserting between the third port 16.3 of the first hybrid 16 and the LMU 20 the second hybrid 40 as shown in FIG. 2; alternatively by inserting between the second port 16.2 of the first hybrid 16 and the LMU 18 the second hybrid 40; and further alternatively by inserting between the second port 16.2 and LMU 18 the second hybrid 40 and between third port 16.3 and LMU 20 a third hybrid (not shown), the PLC impedance of the phases 12.1 and/or 12.2 can be monitored and/or tracked and/or measured in real time.

The second port 40.2 and third port 40.3 of the second hybrid 40 are well terminated in the system characteristic impedance via the PLC carrier system and output impedance at port 42.3 respectively. Variations in the phase impedance presented at second port 16.2 of the first hybrid 16 do not cause significant system impedance variations at third port 16.3 of the first hybrid 16, due to the intrinsic isolation of the first hybrid. The first port 40.1 of the second hybrid 40 is connected to the phase conductor 12.1, to monitor the PLC impedance as aforesaid.

The PLC impedance may be monitored as aforesaid at the carrier frequency (typically but not exclusively 50 kHz to 500 kHz) of the PLC system, utilizing the PLC transceiver as signal source. In this case, the generator associated with logging device 42 is switched off, but port 40.3 is still terminated in the output impedance of port 42.3 of 75 ohm. The power of the tone is divided at the first hybrid 16 between the second and third ports 16.2 and 16.3. Referring only to the outer phase conductor 12.1, power leaving port 16.3 is injected at second port 40.2 of the second hybrid 40, which in turn is coupled to the outer phase 12.1 of the OHTL 12 via first port 40.1.

The monitoring logging device 42 samples and/or measures instantaneous voltages $\hat{V}_{g2}$ and $\hat{V}_{g3}$ at second port 40.2 and third port 40.3, and uses standard and known techniques (such as I and Q component decomposition) to determine the relative amplitude and relative phase of $\hat{V}_{g2}/\hat{V}_{g3}$ of the signals at the third and second ports, to measure the aforementioned complex isolation. From this complex isolation, the PLC impedance at the carrier frequencies can be computed. The monitoring logging device 42 may comprise a very fast sampling device in the time domain, which could compute the magnitude and phase of the signal in various ways known to the person skilled in the art.

In other embodiments, the PLC impedance may be monitored at other user selectable frequencies in the PLC band. In these cases, the tone $\hat{V}_g$ is generated with a selected frequency by the generator forming part of monitoring logging device 42 and is coupled to the OHTL 12. The generator output at 42.3 has an output impedance of 75 ohm. The complex isolation is determined as hereinbefore described, to compute the PLC impedance at the selected frequency.

Hence by monitoring the complex isolation of the second hybrid 40, the PLC impedance of the phase conductor 12.1 may be monitored in real time, while the OHTL may still be carrying the 50 Hz mains power.

The second hybrid 40 and logging device 42 with associated generator may form part of a mobile and portable test arrangement or unit, which may in some embodiments specially be configured to perform tests on line traps or other PLC component in the OHTL. The unit may be connected to the PLC system as hereinbefore described in the aforementioned control room 26 of the first sub-station 11.

Figure 4:
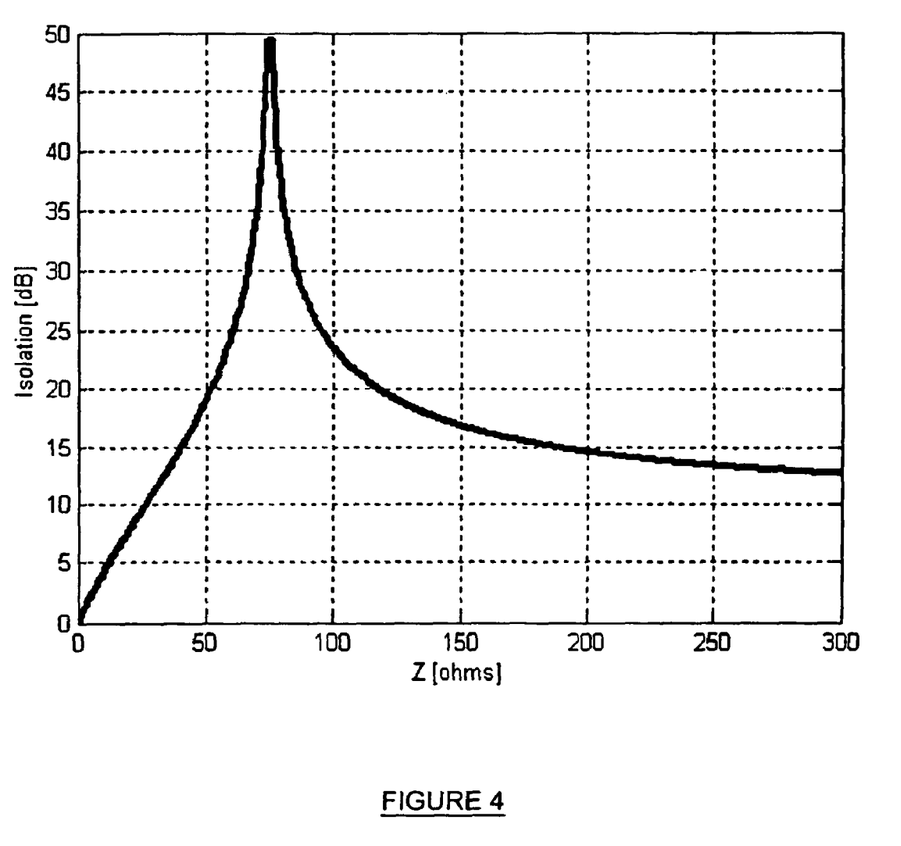
FIG. 4 is a graph illustrating variations in isolation between second and third ports of a monitoring hybrid as a function of real impedance or resistance at a first port of the hybrid.

It has been found that the system according to the invention is very sensitive to the variation in PLC impedance. FIG. 4 illustrates the variation in the isolation magnitude in dB as a function of $Z_1$ where $Z_1$ is real only. This configuration and usage of the hybrid allows sensitive monitoring of the PLC system impedance. For example, for a system characteristic impedance of 75 ohm, if the impedance $Z_1$ at port 40.1 is 60 ohm, then the isolation is 24.61 dB and when $Z_1$=61 ohm, then the isolation is 25.31 dB. A change of one (1) ohm resulted in 0.7 dB.

Many currently available signal level meters can log tone level with 0.25 dB accuracies or better, which means it would be feasible to measure changes in $Z_1$ or the PLC impedance of less than 1 ohm, provided $Z_1$ is close to the system characteristic impedance, ie 75 ohm in this example.

Figure 5:
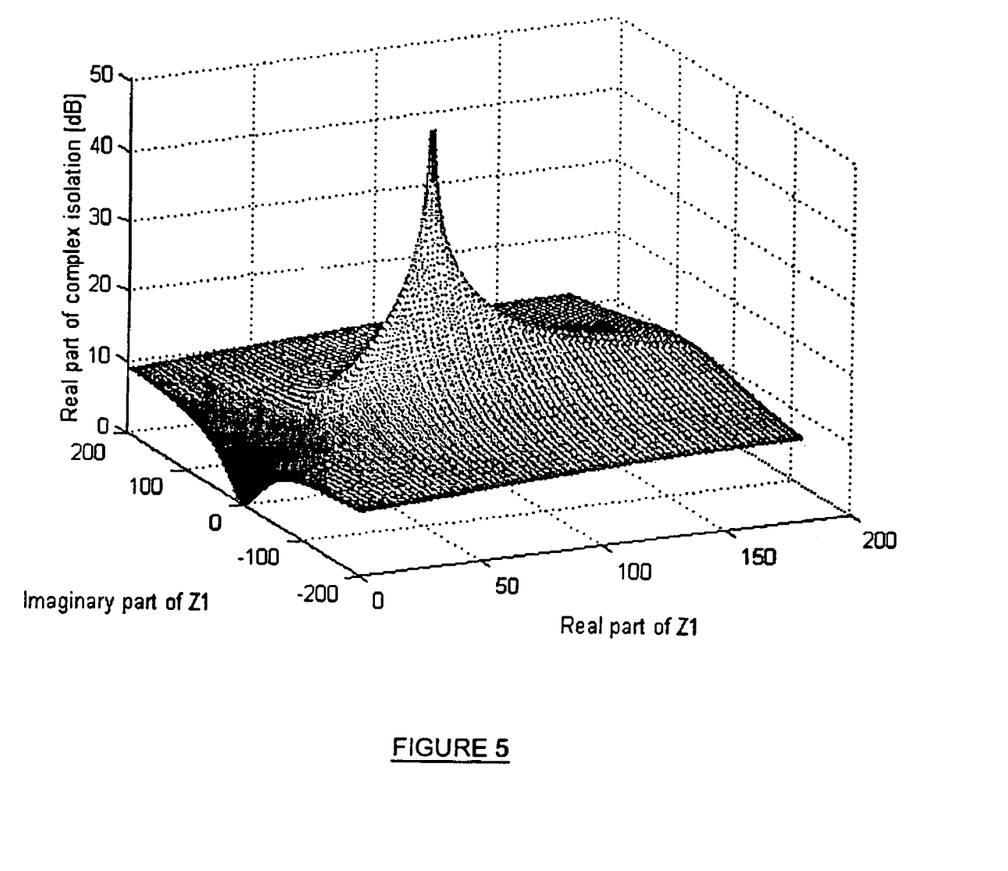
FIG. 5 is a three dimensional representation of a real part of complex isolation between the second and third ports for a complex impedance at the first port.
Figure 6:
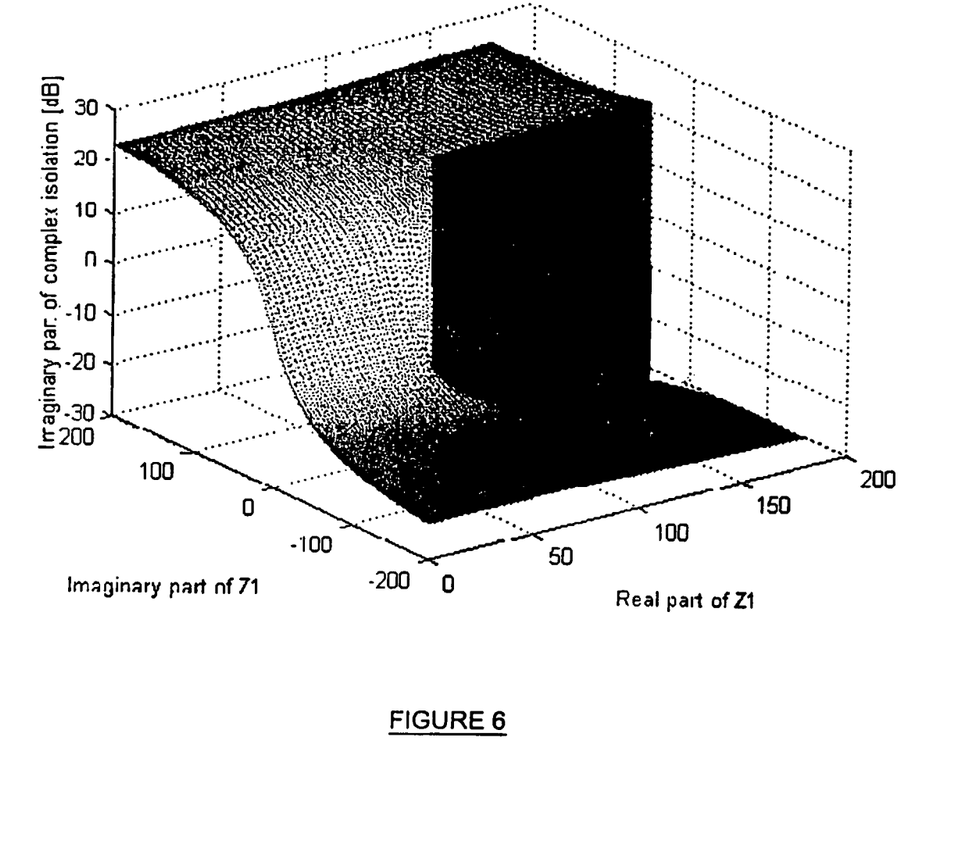
FIG. 6 is a three dimensional representation of an imaginary part of the complex isolation between the second and third ports for a complex impedance at the first port.

By simulating the complex isolation, FIGS. 5 and 6 illustrate the real part of the isolation and the imaginary part respectively. Again it is clear that the system and method is suitably sensitive when the real part of the monitored impedance is close to 75 ohms and the imaginary part is small.

Figure 7:
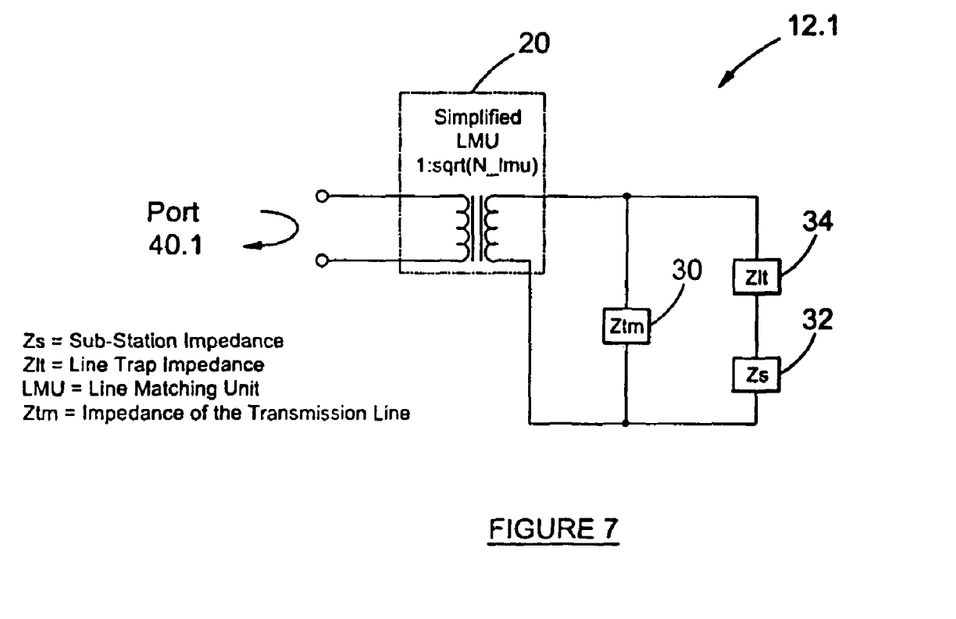
FIG. 7 is a simplified block diagram illustrating PLC impedance components associated with the outer phase conductor of the OHTL to which the monitoring system is connected.

The outer phase conductor 12.1, to which the impedance monitoring system 10 is coupled in FIG. 2, can be represented as in FIG. 7. At the carrier frequencies, the coupling capacitor or CVT can be simplified with a short circuit, as the capacitor provides a low impedance path for the signals to be coupled to the OHTL 12.

In a normal operating PLC system, mainly two major impedances can vary, the impedance Ztm of the transmission line 12 and the impedance Zs of the power or sub-station 11. The impedance Zlt of the line trap is fixed and should not vary under normal operating conditions, unless it is damaged. It is known that the impedance Ztm of the transmission line normally varies with a day-night cycle as the geometry of the conductor changes, primarily due to sag. The power station impedance Zs variations are commonly more dramatic, as station equipment (like transformers) is switched between various states. Therefore, it has an unpredictable step-like nature even under normal operating conditions. These variations in these impedances are transformed via the LMU 20, to vary in the region of 75 ohm.

As illustrated hereinbefore, the impedance monitoring system and method according to the invention are most sensitive at 75 ohm and therefore changes in transmission line impedance Ztm, power station impedance Zs and line trap impedance Zlt can be observed.

The system according to the invention may be permanently or semi-permanently installed at a sub-station and used to monitor the PLC impedance of the phase conductor continuously over a period of time. In other applications the portable arrangement according to the invention may be connected to the line to monitor and measure in real time the impedance of the phase conductor, before the arrangement is disconnected and removed.

Figure 8:
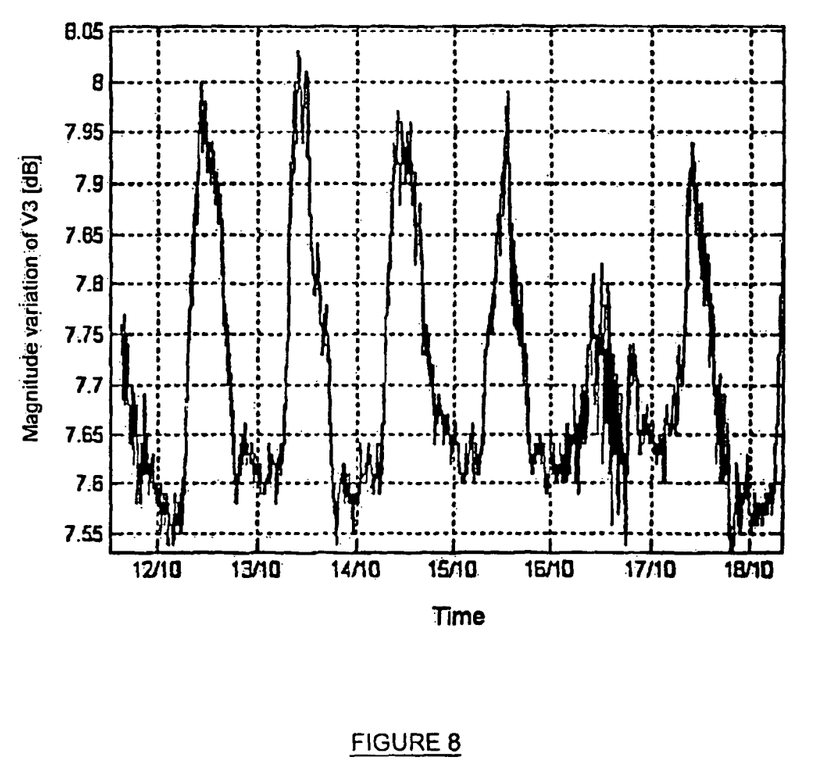
FIG. 8 is a graph of voltage variations during normal use over a period of one week at the third port of the monitoring hybrid forming part of the monitoring system of the invention.

In FIG. 8 there is shown a diagram of the voltage at third port 40.3 of second hybrid 40 in FIG. 2, as logged over a period of one week at a local carrier frequency, thus the signal generator of logging device 42 was switched off, but not disconnected. This graph contains valuable information about the PLC impedance of the OHTL 12, power or substation impedance and the PLC equipment impedance. A clear day-night cycle can be observed within the data, which may relate to the height variation of the line.

PLC based line sag monitoring systems are known which systems measure the average conductor height by monitoring specially coupled PLC sag monitoring tones coupled to the line. The real-time PLC system impedance as obtained with the system and method according to the invention is a critical parameter to have available while operating the PLC based sag monitoring system. It is known that the OHTL transmission line impedance is a function of OHTL sag.

Measurement of the OHTL impedance may therefore be related to OHTL sag, and this information could be utilized to assist in the PLC sag monitoring systems and methods. For example, step changes at either station at the ends of the OHTL may result in a small step change in the signal level of the PLC sag monitoring tones, which may result in uncalibrated PLC sag monitoring system operation, ie unacceptable errors in the relationship between PLC signal amplitude and OHTL sag. By logging the impedances at both stations, the effect of substation switching or any other event that changes the substation impedance, may be compensated for in the PLC sag monitoring system.

Critical PLC components like line traps fail with time, like any other equipment in a harsh electrical environment. The PLC system is designed to be still operational, even if one component, for example a line trap, or more specifically a tuning unit of a line trap, is defective. This philosophy makes it difficult to maintain the PLC system. As stated in the introduction of this specification, currently routine maintenance has to be scheduled to check the functioning of PLC components. The system and method according to the invention may be used to detect defective components, such as a defective LMU or a defective line trap or a coupling capacitor (CC) or capacitor voltage transformer (CVT). Even if the method according to the invention is not used in real time, it may be used to speed up the maintenance process.

Hence the portable test unit comprising the second hybrid 40 and logging device 42 may be configured to constitute a line trap tester. The tester is connectable to the PLC system as hereinbefore described and a defective line trap may be detected from the control room 26 while the HV power network may be operational.

In some applications impedance matching of the PLC system to the impedance of the OHTL is very important. Hence, the system and method according to the invention may be used to optimise impedance matching of the PLC system.

The invention claimed is:

1. A system for monitoring impedance, the system comprising:
   a monitoring power coupling device comprising at least a first port, a second port and a third port;
   the monitoring power coupling device comprising a power splitter and combiner and being configured to divide power received at the first port between the second and third ports, the device further being configured at least partially to isolate the second port from power received at the third port and at least partially to isolate the third port from power received at the second port;
   an isolation between the second and third ports in the form of a ratio between a voltage at the third port and a voltage at the second port being a function of an impedance connected to the first port;
   the first port being connected to the impedance to be monitored;
   at least one of the second port and third port being connected to be driven by an alternating signal source; and
   the second and third ports being connected to a monitoring device for monitoring signals at the second and third ports, thereby to monitor the isolation between the second and third ports and hence impedance at the first port;
   wherein the power splitter and combiner comprises a hybrid comprising a transformer providing the first, second and third ports.

2. The system as claimed in claim 1, wherein the isolation is a complex ratio between an amplitude and a phase of the voltage at the third port and an amplitude and a phase of the voltage at the second port.

3. The system as claimed in 1 or 2, wherein the first port is connected to a first phase conductor of an overhead power transmission line (OHTL) to monitor the impedance of the first phase conductor.

4. The system as claimed in claim 3, wherein the impedance being monitored is the impedance presented by the first phase conductor to a power line carrier (PLC) signal and which PLC signal is injected on the OHTL by a PLC system.

5. The system as claimed in claim 4, wherein the first port is terminated by the impedance to be monitored and the second and third ports are terminated by respective impedances, each of which is substantially equal to a characteristic impedance of the PLC system.

6. The system as claimed in claim 5, wherein the PLC system comprises a PLC power coupling device having a first port, a second port and a third port, and a PLC transceiver connected to the first port of the PLC power coupling device, the second port of the PLC power coupling device being connected to a second phase conductor of the OHTL and the third port of the PLC power coupling device being connected to the second port of the monitoring power coupling device to cause the PLC transceiver to drive the second port of the monitoring power coupling device.

7. The system as claimed in claim 5, wherein the third port of the monitoring power coupling device is connected to a signal generator to drive the third port.

8. The system as claimed in claim 4, wherein the first phase conductor is connected to the first port by coupling equipment and a signal transmission line.

9. The system as claimed in claim 8, wherein the coupling equipment comprises a line matching unit and one of a coupling capacitor and a capacitor voltage transformer; and wherein the signal transmission line comprises a coaxial cable.

10. A method of monitoring impedance, the method comprising the steps of:
    using a monitoring power coupling device comprising at least a first port, a second port and a third port, the monitoring power coupling device being configured to divide signals received at the first port between the second port and the third port, the device further being configured at least partially to isolate the second port from power received at the third port and at least partially to isolate the third port from power received at the second port;
    an isolation between the second and third ports in the form of a ratio between a voltage at the third port and a voltage at the second port being a function of an impedance at the first port;
    connecting the first port to the impedance to be monitored;
    driving at least one of the second port and the third port with an alternating signal; and
    monitoring a ratio of voltages at the second and third ports respectively, thereby to monitor the isolation and hence impedance at the first port.

11. A method as claimed in claim 10, wherein the ratio is a complex ratio and wherein instantaneous voltages at the second and third ports are measured and from which relative amplitudes and phases are determined to monitor the complex ratio and the impedance at the first port.

* * * * *